UNITED STATES PATENT OFFICE.

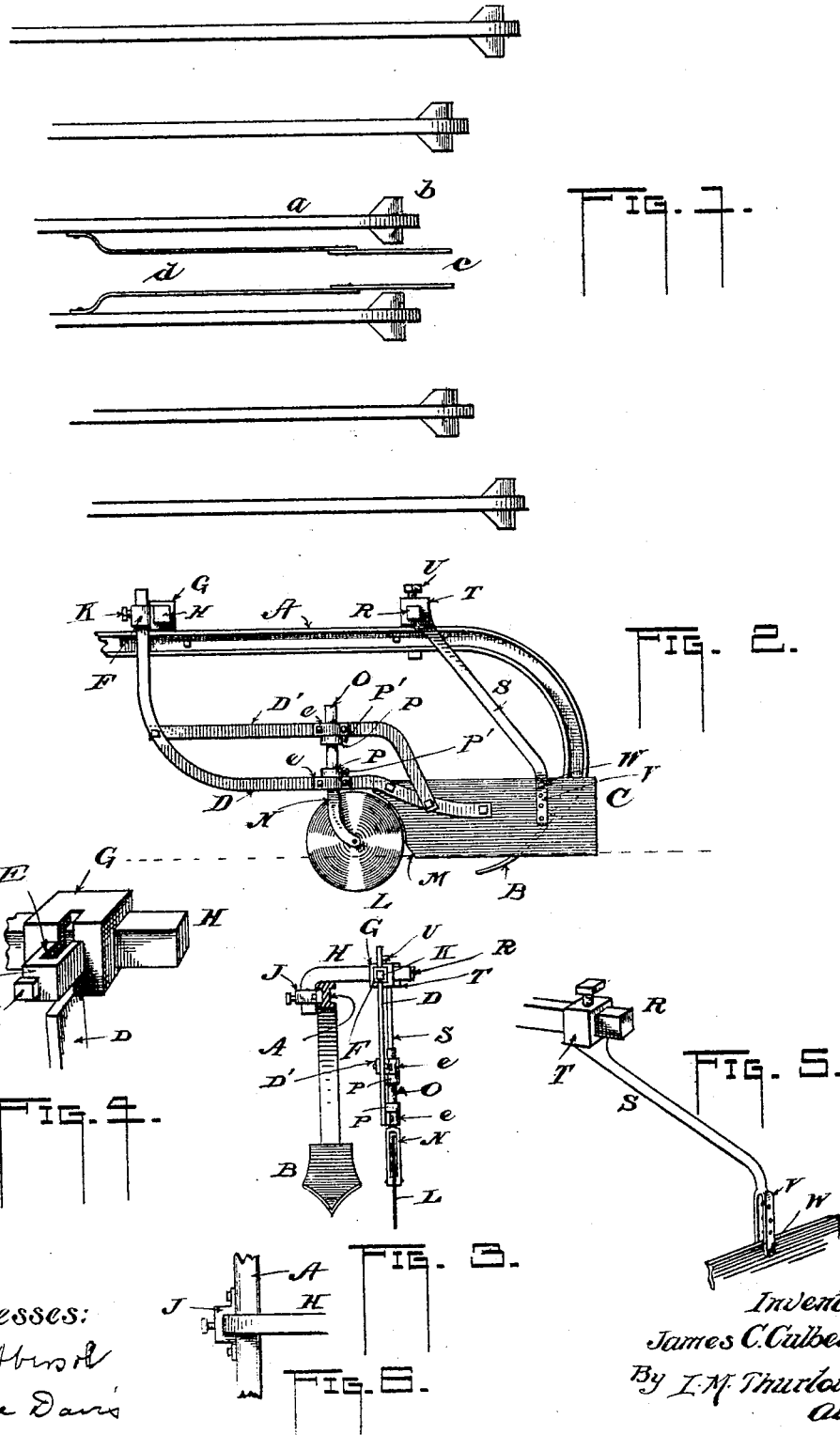

JAMES C. CULBERTSON, OF DEERCREEK, ILLINOIS.

PLOW-SHIELD.

No. 795,429.  Specification of Letters Patent.  Patented July 25, 1905.

Application filed January 17, 1905. Serial No. 241,511.

*To all whom it may concern:*

Be it known that I, JAMES C. CULBERTSON, a citizen of the United States, residing at Deercreek, in the county of Tazewell and State of Illinois, have invented certain new and useful Improvements in Plow-Shields; and I do hereby declare that the following is a full, clear, and exact description of the invention, which will enable others skilled in the art to which it appertains to make and use the same.

This invention has reference to plowshields.

The primary object of the invention is to place the shields of a plow or cultivator in a rigid position while cultivating young corn.

A further object of the present invention lies in the provision of a cutter to precede the shield for the purpose of cutting all stalks or other obstructions lying in front of the said shield.

Still another object of the invention is to provide means for obtaining certain vertical and horizontal adjustments of the shield, as well as vertical adjustment of the cutter.

The use of a shield in cultivating corn is not new, and in the employment of these devices it has been the practice to pivot them upon the cultivator or plow beam, allowing them to float at will by following the contour of the surface of the field passed over. The result of this practice has been disastrous from the fact that said shields when encountering an underlying stalk or root or other obstruction the dragging of that obstruction has pulled the young corn from the ground, and especially if the corn has happened to grow up through the said obstruction. Much corn has thus been lost, and it is therefore my object to overcome the objections to this manner of carrying the shields.

In the appended drawings, Figure 1 is a top view of several cultivator-beams and their shovels, showing the location of the shields and the manner of attaching them pivotally to said beams in the ordinary manner. Fig. 2 is a side elevation of a cultivator-beam, showing my shield and cutter and the means for attaching and adjusting the same on said beam. Fig. 3 is a front elevation of a cultivator-beam and its shovel, showing an arm secured to the former, on which the cutter and shield are mounted. Fig. 4 is a perspective view of a fitting by which the said cutter and shield are adjusted vertically or horizontally, or both. Fig. 5 is a perspective view of a portion of an arm similar to that shown in Fig. 3 for attachment to the cultivator-beam, on which the rear end of the shield is supported for adjustment. Fig. 6 is a top view of a portion of the cultivator-beam and an arm clamped thereto.

In Fig. 1 the cultivator-beams are represented by the letter A, the shovels by B, while the shields C are located between the two middle shovels and are pivoted on the middle beams by means of the arms D. The other figures of the drawings show the arrangement of the shields, in which A is the cultivator-beam, having a shovel B, as is customary. Adjacent to the said shovel is the shield C, which stands vertically, the forward end having attachment with and supported in the upright position by a forwardly and upwardly extending arm D, that portion of said arm lying near the shield being horizontal and the portion in the region of the beam A being vertical, said vertical portion holding a position within a vertical opening or slot E of a fitting F G, slidably carried on an arm H, secured, by means of a clip J, to the beam A, as shown in Fig. 6. It will be noted that the slot E extends from the portion F of the said fitting into the portion G, whereby the arm H is exposed within said slot. The arm D, before mentioned, occupies the said slot E, and one of its edges contacts with the arm H, being held thereagainst by means of a set-screw K in the portion F. By this means it will be at once evident that the friction between the arm D and the arm H and screw K by the tightening of the latter will serve to hold the various parts in a firm position, the screw serving to permit either a vertical adjustment of the arm D or a horizontal movement of the fitting F G along the arm H. In front of the shield C, I prefer to place a rolling cutter L, the adjacent edge of the said shield being curved to allow it to approach closely to said cutter, as shown, while the lower corner behind the cutter is beveled backward, as at M. Said cutter is supported in a vertical fork N, having a stem O, which has bearings $e$ $e$ in the arm D and an auxiliary arm or rod at D', whose one end is secured to the arm D well forward of the cutter and whose other end is attached to the arm and shield by being downturned from the region of the bearing of the said stem O. Thus the latter member is provided with a rigid support, and vertical adjustment of the cutter is had by the use of the adjustable collars P P, the set-screws P' P' permitting the desired changes, as will be understood. The fork N is carried backward of the axis of the stem O, so that the center of the cutter will be behind said axis, whereby the said cutter is permitted to "caster" or follow the movements of the implement.

In addition to the construction already described I secure to the beam A an arm R, similar to H and attached in the same way, to which is adjustably secured a downwardly-extending rod S, by means of the head T and its set-screw U, all of which provides for a horizontal adjustment of said rod S. The lower extremity of the latter is bifurcated, as at V, each portion having holes therethrough for receiving a bolt W. A hole (not shown) in the shield permits said bolt to pass through the fork and shield, the holes providing for any vertical adjustment of the said shield that may be desired.

As has been stated hereinbefore, it has been the custom to permit the shields to float at will during the cultivating operation; but by reason of the disadvantages mentioned it has been found to be expedient to fix the shield at the desired elevation with reference to the shovels. I have also found it to be of advantage to precede the shield with the cutter mentioned, so that every obstacle will be severed, so that there can be no possibility of uprooting the corn, and I wish to make it clearly understood that it is not the intention to confine myself to the particular means herein described for accomplishing the adjustments of the various parts, since other equally good means may be employed to accomplish the same end. It is of course desirable to keep the cutter slightly lower than the shield in order that a free passage may be cut for the passage of said shield, and I have provided for adjustments in any and all directions for the shield, so that various effects may be obtained in the cultivating operation.

Having described my invention, what I claim as new is—

1. In a cultivator, the combination of the shovel-beam thereof, a shield adjacent to the shovel, an arm secured at one end to the rear of the shield, the other end secured to the said beam for both vertical and horizontal adjustment, a second arm, secured to the free end of the shield and extending forward and upward and secured to the beam and capable of horizontal and vertical adjustment, and a rolling cutter journaled on the latter arm immediately forward of the shield and adapted to caster at will.

2. In a cultivator, the shovel-beam, a shield adjacent thereto, an arm adjustably secured to the rear end of the shield and also adjustable on the beam, a second arm secured to the beam for both horizontal and vertical adjustment, a rolling cutter forward of the shield and journaled on the said second arm, the forward end of the shield being recessed to admit the cutter as shown and for the purposes described, the shield and cutter having fixed relative position while in operation.

3. The combination of the plow-beam A and its shovel B, the shield C adjacent to the latter, the adjustable member D secured to the shield, the arm H on the plow-beam, means for adjustably securing the said member D to the said arm H and permitting vertical and horizontal adjustment, the arm R on the plow-beam, the arm S attached to the shield and means for adjusting the said arm S horizontally and the rear end of the shield vertically for the purposes set forth.

4. The combination of the plow-beam A and its shovel B, the shield C adjacent to the latter, the adjustable member D secured to the shield at its forward end, the arm H on the plow-beam, means for adjustably securing the said member D to the said arm H the same permitting vertical and horizontal adjustment, the cutter L having bearing on the member D forward of the shield, and means for adjusting the rear end of the shield vertically and horizontally for the purposes set forth and described.

In testimony whereof I affix my signature in presence of two witnesses.

JAMES C. CULBERTSON.

Witnesses:
HENRY C. O'BRIEN,
FRANK L. BELSLY.